United States Patent [19]

Yasunobu et al.

[11] Patent Number: 5,018,689
[45] Date of Patent: * May 28, 1991

[54] METHOD AND DEVICE FOR STOPPING VEHICLE AT PREDETERMINED POSITION

[75] Inventors: Seiji Yasunobu, Yokohama; Shoji Miyamoto, Kawasaki; Hirokazu Ihara, Machida, all of Japan

[73] Assignee: Hitachi, Ltd., Tokyo, Japan

[*] Notice: The portion of the term of this patent subsequent to Jul. 25, 2006 has been disclaimed.

[21] Appl. No.: 322,991

[22] Filed: Mar. 14, 1989

Related U.S. Application Data

[63] Continuation of Ser. No. 127,549, Dec. 2, 1987, Pat. No. 4,852,007, which is a continuation of Ser. No. 488,455, Apr. 25, 1983.

[30] Foreign Application Priority Data

Apr. 27, 1982 [JP] Japan .................................. 57-70931
May 7, 1982 [JP] Japan .................................. 57-75256

[51] Int. Cl.$^5$ .............................................. B61L 3/08
[52] U.S. Cl. .......................... 246/182 B; 246/182 C; 303/100; 303/20; 364/426.01; 364/426.05
[58] Field of Search ...................... 364/426.05, 426.04, 364/426.01, 426.02, 426.03; 105/61; 180/244, 282; 303/93, 96, 97, 20, 100, 104, 105, 106, 109; 246/182 R, 182 A, 182 B, 182 C, 184

[56] References Cited

U.S. PATENT DOCUMENTS

| | | | |
|---|---|---|---|
| 3,131,975 | 5/1964 | Smith et al. | 303/104 |
| 3,508,795 | 4/1970 | Scharlack et al. | 303/104 |
| 3,825,799 | 7/1974 | Matsumura | 303/109 |
| 4,066,230 | 1/1978 | Nohmi et al. | 364/426.05 X |
| 4,384,695 | 5/1983 | Nohmi et al. | 246/182 B |
| 4,410,154 | 10/1983 | Matty | 246/182 C |
| 4,852,007 | 7/1989 | Yasunobu et al. | 364/426.01 |

Primary Examiner—Douglas C. Butler
Attorney, Agent, or Firm—Antonelli, Terry, Stout & Kraus

[57] ABSTRACT

Disclosed are a method and a device for stopping a vehicle at a predetermined position in which the distance between actual and target positions of the vehicle and the velocity and accleration of the vehicle are detected so as to perform brake control by selecting brake control notches on the basis of the detected values of the distance, the velocity and the acceleration to thereby stop the vehicle at the predetermined position, are featured in that the stop gap accuracy in the case where the notch presently on actuation is maintained as well as the stop gap accuracy are obtained as fuzzy values and compared with each other to thereby perform the notch selection.

7 Claims, 5 Drawing Sheets

METHOD AND DEVICE FOR STOPPING VEHICLE AT PREDETERMINED POSITION

BACKGROUND OF THE INVENTION

This is a continuation application of Ser. No. 127,549, filed Dec. 2, 1987, now U.S. Pat. No. 4,852,007, which is a continuation of application Ser. No. 488,455, filed Apr. 25, 1983.

The present invention relates to a method and a device for stopping a vehicle at a predetermined position and particularly to a method and a device which makes it possible to stop a vehicle, which is driven by discrete control commands generated for example by notching representing predetermined brake settings, at a predetermined target position with high accuracy and with less changes in notching operation.

FIG. 1 is a block diagram illustrating an example of a conventional device for automatically stopping a train at a predetermined position and FIG. 2 is a graph illustrating a velocity pattern for explaining the operations thereof. In FIG. 1, the device comprises a tachometer generator 1, a velocity calculating circuit 2, a distance integrating circuit 3, a position marker 4, a point signal detector 5, a pattern generator 6, a comparator 7, a brake controller 8 and a brake device 9.

According to this conventional device, the point signal detector 5 disposed on a vehicle detects the position marker 4 provided on the ground at a position P (hereinafter referred to as point-P) a predetermined distance λ on this side of a target position O (hereinafter referred to as point-O). In response to a point detection signal from the point signal detector 5, the distance integrating circuit 3 counts pulses from the tachometer generator 1 so as to produce a distance S along which the vehicle has travelled from the point-P to the current position at that time, and the pattern generator 6 selects a value of the distance λ to the target position out of a memory provided therein so as to produce a target velocity pattern $V_P$ on the basis of the following equation (1):

$$V_P = \sqrt{7.2 \, \beta_P (l - S)} \quad (1)$$

where $\beta_P$ represents a predetermined deceleration.

The tachometer generator 1 produces pulses at a frequency proportional to the current vehicle velocity $V_T$ and the velocity calculating circuit 2 calculates a digital value of the current or actual velocity $V_T$ of the vehicle from the pulses. The comparator 7 compares the current or actual velocity $V_T$ with the target velocity pattern $V_P$ produced from the pattern generator 6. On the basis of an output ($V_T$-$V_P$) of the comparator 7, the brake device 9 is proportionally controlled by the brake controller 8 so that the current or actual velocity $V_T$ follows the target velocity pattern $V_P$ to stop the vehicle in close vicinity to the target point-O.

In this conventional device, however, there may occur an offset of tracing error with respect to the target velocity pattern $V_P$ due to the deviations in brake force of the brake device 9 as well as the deviations in external force due to the grade of railway, thereby deteriorating the stop gap accuracy. Further, if integral control is performed for the brake device 9 in addition to the proportional control in order to prevent the above-mentioned offset of tracing error from occurring, it will necessarily increase the frequency of notch-changings, i.e., change of brake settings to cause another problem that a ride in the vehicle may become uncomfortable.

SUMMARY OF THE INVENTION

An object of the invention is to eliminate the problems as mentioned above in the conventional method and device for stopping a vehicle at a predetermined position.

Another object of the present invention is to provide a method and a device in which not only the final stop gap accuracy is limited within tolerance but the number of notch-changes is reduced to the utmost so as to prevent the occurrence of an uncomfortable ride in a vehicle. To attain such objects, according to the present invention, a method and a device for stopping a vehicle at a predetermined position in which the distance between the current and target positions of the vehicle and the velocity and acceleration of the vehicle are detected so as to perform brake control by selecting brake control notches or settings on the basis of the detected values of the distance, the velocity and the acceleration to thereby stop the vehicle at the predetermined position, are featured in that the stop gap accuracy in the case where the current notch is maintained as it is and the stop gap accuracy in the case where the notch is changed by a predetermined amount are obtained as fuzzy values and compared with each other to thereby perform the notch selection.

It is a further object of the present invention to obtain an optimum condition of a given event relating to control of a controllable subject such as stopping of a running vehicle, for example, a moving train, at a desired position and includes the features of (a) obtaining a value of a first parameter relating to the current state of the vehicle or controllable subject such as a count speed or acceleration of the vehicle, (b) estimating various values of a second parameter based on the value of the first parameter, which would be obtained if predetermined control modes are applied to the vehicle, respectively, and (c) determining which one of the predetermined control modes is to be applied to the running vehicle by evaluating the estimated values according to a selected on of a plurality of predetermined rules, for example. Especially, the evaluation is made based on fuzzy values representing the degree of satisfaction of the estimated values of the second parameter in accordance with performance indices.

BRIEF DESCRIPTION OF THE DRAWINGS

The objects, features and advantages of the invention will be clearly understood from the following description of the embodiments of the invention with reference to the accompanying drawings in which.

DESCRIPTION OF THE PREFERRED EMBODIMENTS

Figure 1:
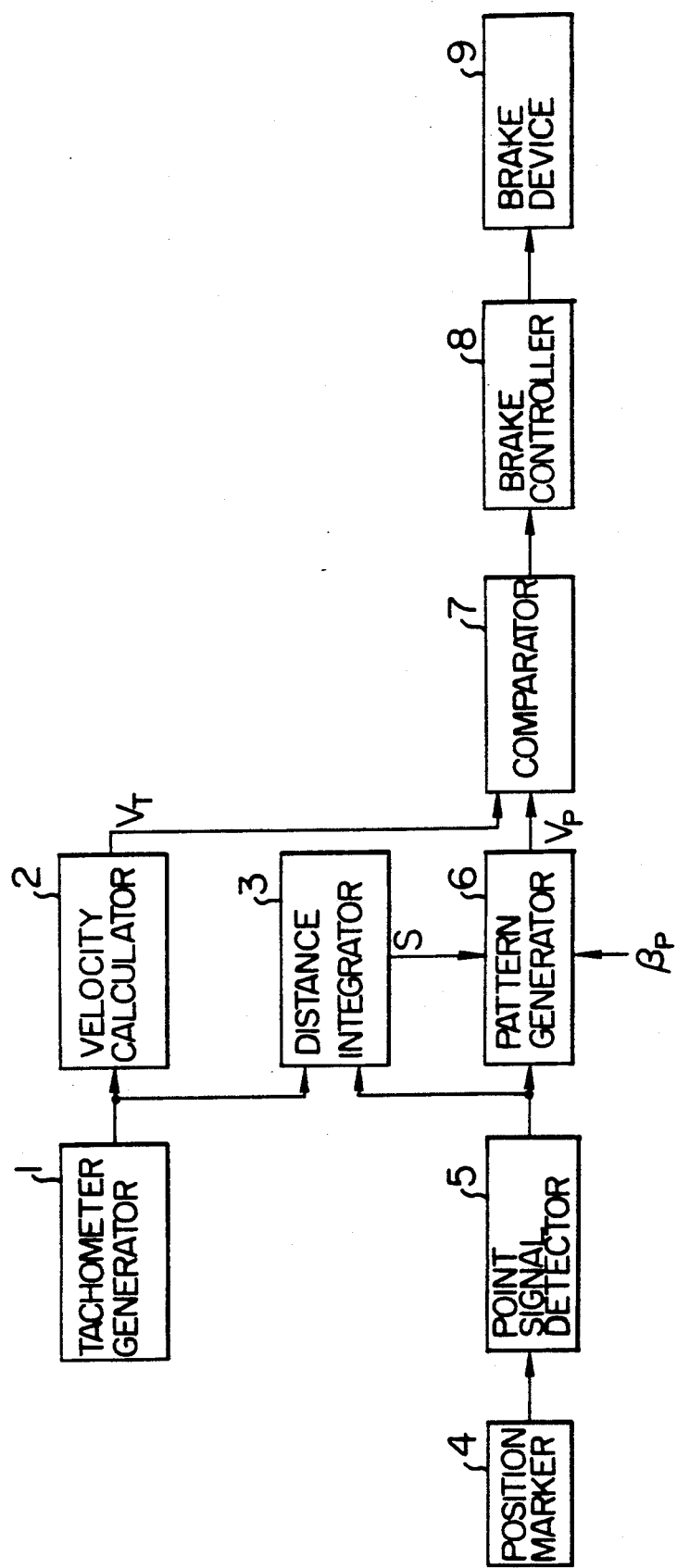
FIG. 1 is a block diagram illustrating an example of a conventional device for stopping a vehicle at a predetermined position.
Figure 2:
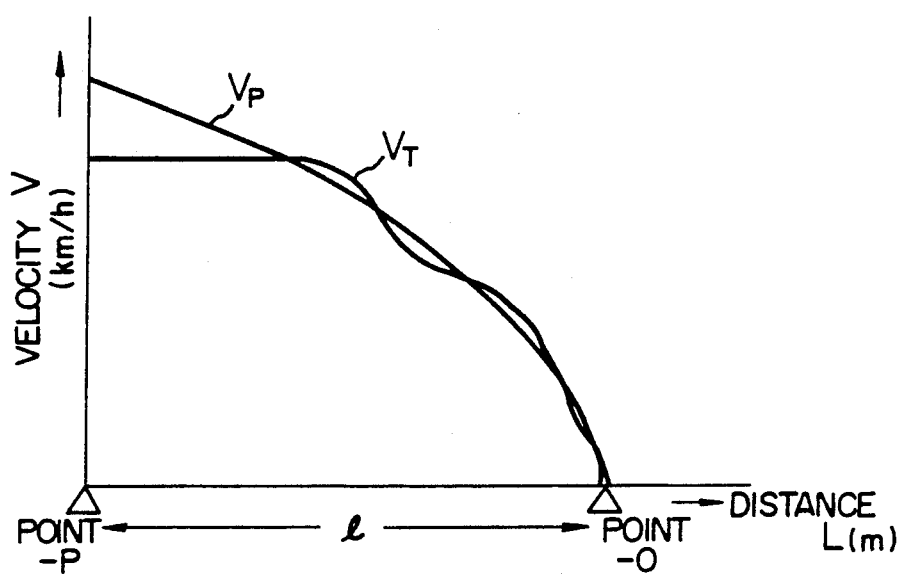
FIG. 2 is a graph of a velocity pattern for explaining the operation of the device of FIG. 1.
Figure 3:
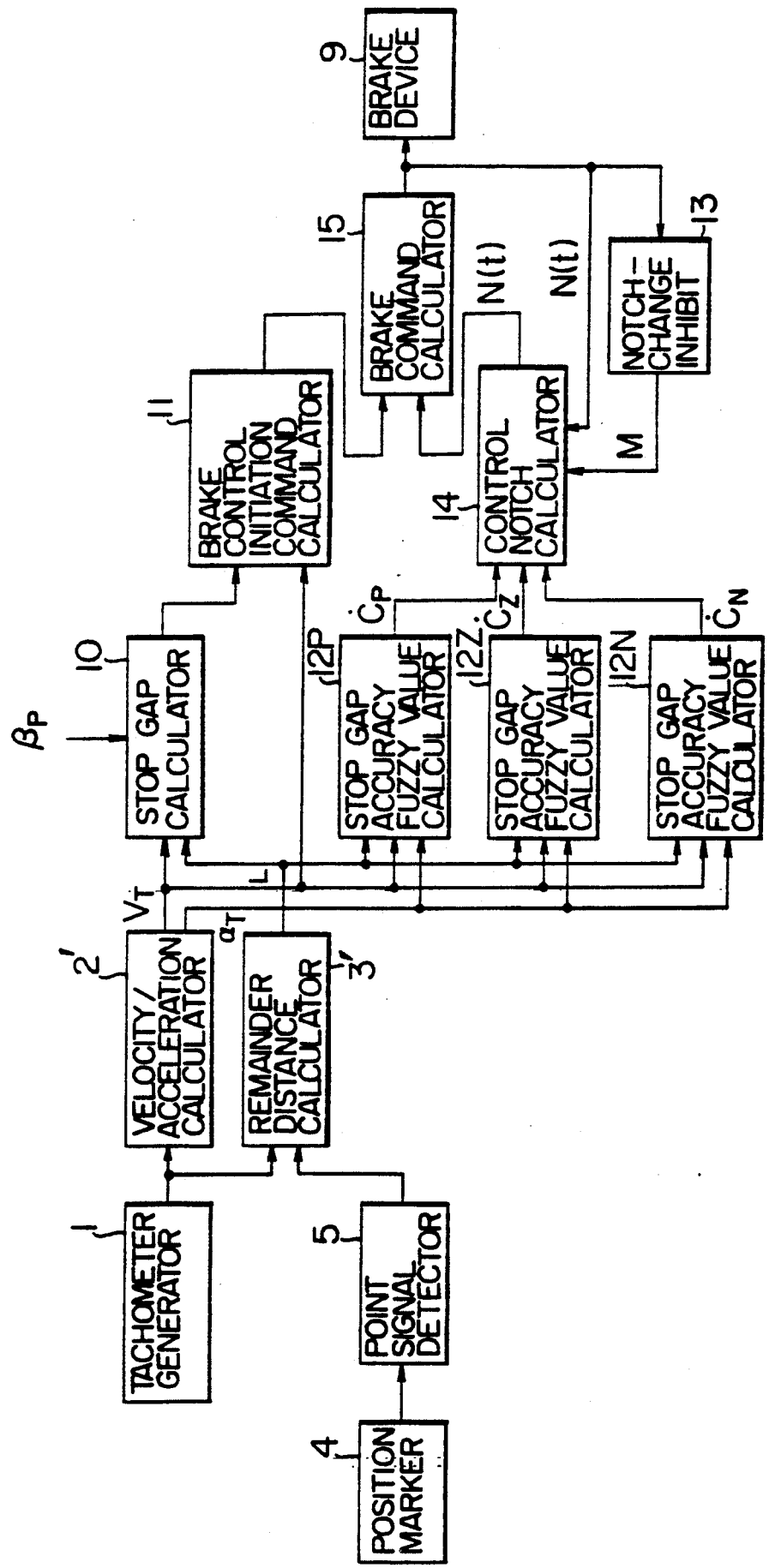
FIG. 3 is a block diagram of an embodiment of the device for stopping a vehicle at a predetermined position according to the present invention.

With reference to FIG. 3, there is shown a block diagram of an embodiment of the device for stopping a vehicle at a predetermined position according to the present invention. In FIG. 3, the same constituent components as those shown in FIG. 1 are represented by the same reference numerals as those used in FIG. 1. In FIG. 3, the reference numeral 2' denotes a velocity/acceleration calculating circuit for calculating an actual or current velocity $V_T$ and an actual or current acceleration $\alpha_T$ of the vehicle on the basis of the pulses produced in the last one second from the tachometer generator 1, 3' denotes a remainder distance calculating circuit for calculating a distance $L_1$ between a current position $x_1$ and a target stop point-O of the vehicle, 10 denotes a notch stop gap calculating circuit for calculating a stop gap $L_2$ in the case where the vehicle is braked with a selected notch at a given point on the basis of the following equation (2) by using the actual or current velocity $V_T$ of the vehicle, the distance $L_1$ to the target point-O and a deceleration $\beta_P$ predetermined corresponding to the selected notch $$L_2 = L_1 - V_T^2/(7.2 \cdot \beta_P) \quad (2)$$

and 11 denotes a brake control initiation command calculating circuit for calculating a time $\Delta T$ to initiation of the braking control in the case where the vehicle runs with the current velocity on the basis of the following equation (3) by using the above-mentioned stop gap error $L_2$ and the current velocity $V_T$ $$\Delta T = 3.6 \cdot L_2/V_T \quad (3)$$

and producing a signal to command initiation of the brake control for stopping the vehicle at the predetermined position when the calculated time $\Delta T$ becomes equal to or smaller than a predetermined time (for example one second).

The reference numerals 12Z, 12P and 12N denote stop gap accuracy fuzzy value calculating circuits for calculating fuzzy values of stop gap accuracy when the initially selected notch or brake setting is maintained, when one notch is increased and when one notch is decreased, respectively, 13 denotes a notch-change inhibit circuit for producing a signal M for inhibiting the notch-change for a predetermined time interval, for example, one second after a notch-change has been performed, and 14 denotes a control notch calculating circuit for performing fuzzy reasoning on the basis of the respective outputs of the stop gap accuracy fuzzy value calculating circuits 12Z, 12P and 12N so as to calculate a notch command $N_t$ when the notchchange is not inhibited, and 15 denotes a brake command calculating circuit for interrupting the output of the control notch calculating circuit 14 on the basis of the output of the brake control initiation command circuit 11.

Figure 4:
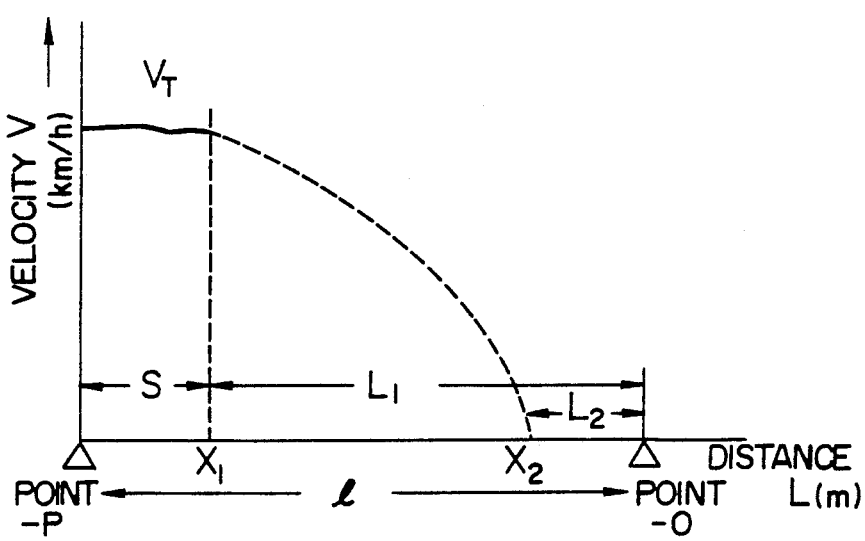
FIGS. 4 is a graph for explaining the operation of the device of FIG. 3.
Figure 5:
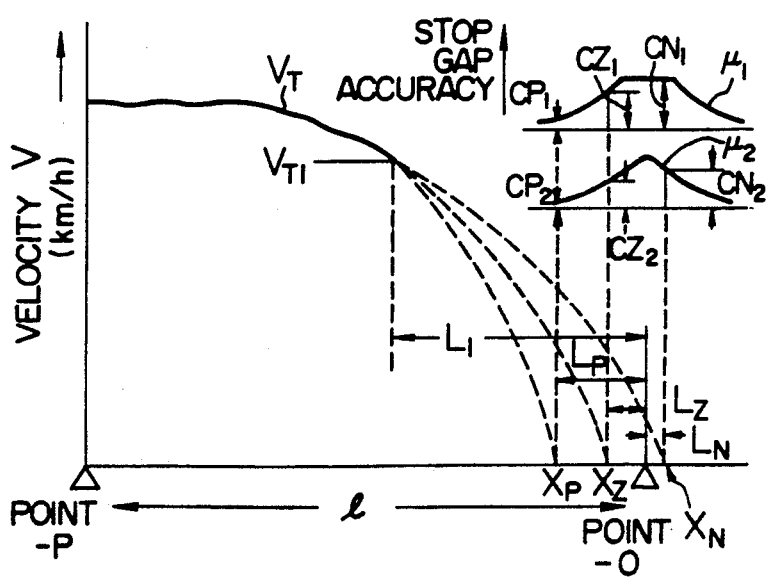
FIG. 5 is another graph for explaining the operation of the device of FIG. 3.

Referring to FIGS. 4 and 5, the operation of this embodiment will be described hereunder.

FIG. 4 is a diagram for explaining the operation to determine the brake control initiation time to control a vehicle to stop at a predetermined position and shows the condition that the vehicle has passed by the point-P placed by a predetermined distance $\lambda$ on this side from the target stop point-O and is at a position $x_1$. The brake control initiation command calculating circuit 11 calculates the time to braking control $\Delta t$ on the basis of a current velocity $V_T$ and the stop gap error $L_2$ obtained by the notch stop gap calculating circuit 10 so as to produce a brake control initiation command when the time to braking control $\Delta t$ becomes equal to or smaller than a predetermined time (for example one second).

FIG. 5 is a diagram for explaining the operation to perform the brake notch selection for stopping a vehicle at a predetermined position. The stop gap accuracy fuzzy value calculating circuits 12Z, 12P and 12N calculate the values $L_Z$, $L_P$ and $L_N$ of stop gap accuracy on the basis of the following equations (4)

$$\begin{aligned} L_Z &= L_1 - V_{T1}^2/(-7.2 \cdot \alpha_{T1}) \\ L_P &= L_1 - V_{T1}^2/\{-7.2(\alpha_{T1} + \Delta\alpha)\} \\ L_N &= L_1 - V_{T1}^2/\{-7.2(\alpha_{T1} - \Delta\alpha)\} \end{aligned} \quad (4)$$

by using the remainder distance $L_1$ to the target point-O obtained by the remainder distance calculating circuit 3', the current velocity $V_{T1}$ obtained by the velocity/acceleration calculating circuit 2', the acceleration $\alpha_{T1}$ and a predetermined acceleration per one notch $\Delta\alpha$ (for example 0.5 Km/h/sec).

Assume now that the stop gap accuracy fuzzy value is composed of the following two support of fuzzy sets:

(1) the value ($\mu_1$) to enable the vehicle to stop within an allowable error; and (2) the value ($\mu_2$) to enable the vehicle to accurately stop at the target position.

The membership function representing the two support of fuzzy sets may be defined by way of example as follows: Assuming that x is a stop gap error (m) and the allowable error is 0.5 m, the membership function $\mu_1(x)$ of the support of fuzzy set to enable the vehicle to stop within an allowable error is defined as $$\begin{aligned} &\text{when} \quad x < -0.5 \quad &\mu_1(x) = -0.5/x \\ &\text{when} \quad -0.5 \leq x \leq 0.5 \quad &\mu_1(x) = 1.0 \\ &\text{when} \quad 0.5 < x \quad &\mu_1(x) = 0.5/x \end{aligned} \quad (5)$$

and the membership function $\mu_2(x)$ of the support of fuzzy set to enable the vehicle to accurately stop at a target position is defined as $$\begin{aligned} &\text{when} \quad x < -0.1 \quad &\mu_2(x) = -0.1/x \\ &\text{when} \quad -0.1 \leq x \leq 0.1 \quad &\mu_2(x) = 1.0 \\ &\text{when} \quad 0.1 < x \quad &\mu_2(x) = 0.1/x \end{aligned} \quad (6)$$

The stop gap accuracy is expressed by the fuzzy values composed of a pair of membership function values $\mu_1(x)$ and $\mu_2(x)$ as mentioned above. That is the stop gap fuzzy values $\hat{C}_Z$, $\hat{C}_P$ and $\hat{C}_N$ when the current notch or brake setting is maintained, when the notch or brake setting is changed to increase by one notch or brake setting and when the notch is changed to decrease by one notch, respectively, are expressed as follows on the basis of the values $L_Z$, $L_P$ and $L_N$:

$$C_Z = \{C_{Z1}, C_{Z2}\} = \{\mu_1(L_Z), \mu_2(L_Z)\} \\ C_P = \{C_{P1}, C_{P2}\} = \{\mu_1(L_P), \mu_2(L_P)\} \\ C_N = \{C_{N1}, C_{N2}\} = \{\mu_1(L_N), \mu_2(L_N)\}\} \quad (7)$$

The control notch calculating circuit 14 performs the notch selection on the basis of the following fuzzy reasoning (1)–(3) in response to the outputs $\dot{C}_Z$, $\dot{C}_P$ and $\dot{C}_N$ from the stop gap accuracy fuzzy value calculating circuits 12Z, 12P and 12N respectively:

(1) If it is possible to stop the vehicle within tolerance with the current notch, the current notch is maintained;

(2) If it is possible to accurately stop the vehicle at the target position by increasing the notch by one, the notch is changed to increase by one; and (3) If it is possible to accurately stop the vehicle at the target position by decreasing the notch or brake setting by one, the notch is changed to increase by one.

The particular notch selection on the basis of the fuzzy reasoning is performed by selecting the maximum values of the membership function ($C_{Z1}$, $C_{P2}$ and $C_{N2}$) corresponding to the above-mentioned fuzzy reasoning (1)–(3). This control is achieved when no notch-change inhibit signal M is produced from the notch-change inhibit circuit 13.

According to this embodiment, since the control to stop a vehicle within an allowable error with respect to a target position is first considered and the notch is changed only when the vehicle may be more accurately stopped by changing the notch to increase/decrease by one, it is possible to realize a method and a device for stopping a vehicle at a predetermined position with accuracy, with less change in notching and with a comfortable ride in the vehicle.

The various calculating circuits 10–15 may be realized easily by combining various kinds of calculating elements or alternatively may be realized by using processing apparatus such as a microcomputer.

Figure 6:
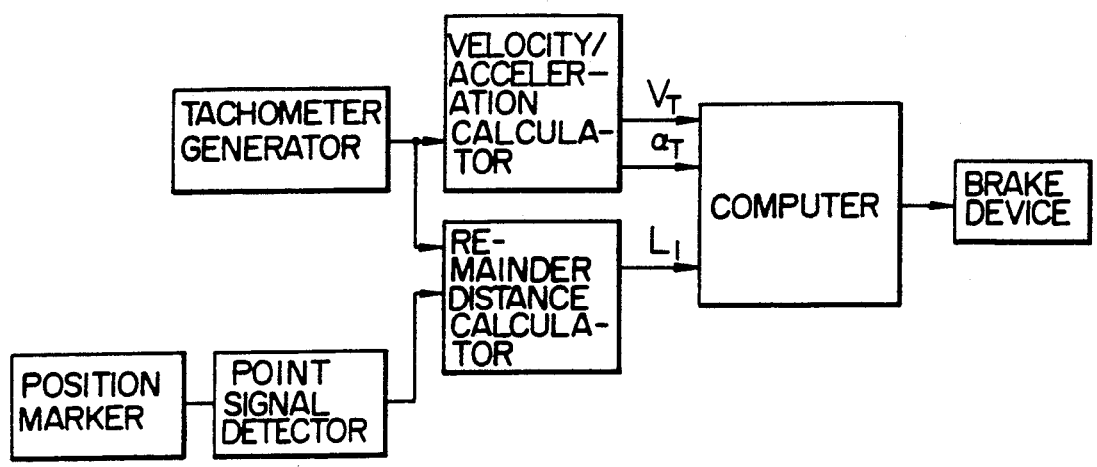
FIG. 6 is a block diagram of another embodiment of the device for stopping a vehicle at a predetermined position according to the present invention.

FIG. 6 shows the configuration of another embodiment of the device for stopping a vehicle at a predetermined position according to the present invention, in which a microcomputer 16 is utilized instead of the calculating circuits 10–15.

Figure 7:
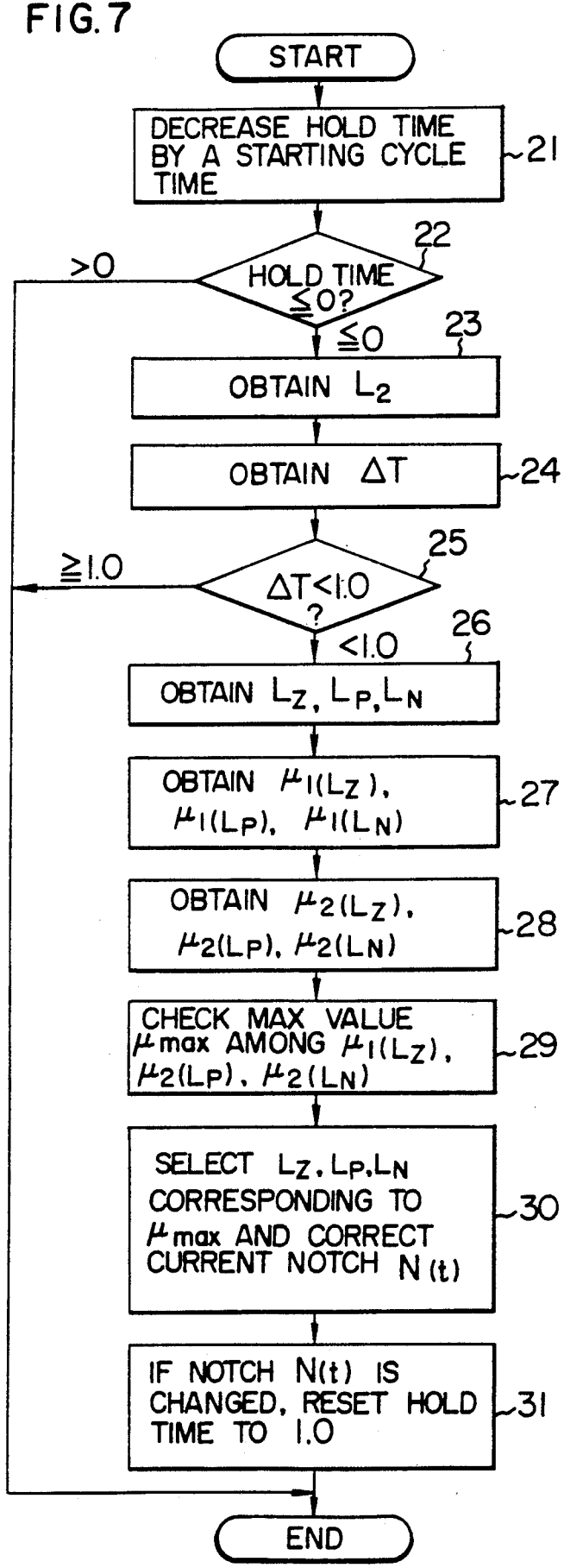
FIG. 7 is a flow-chart for processing in the control section of the device of FIG. 6.

FIG. 7 shows an example of a processing flowchart for the microcomputer 16. The program used in this computer 16 has a function to obtain the notch command N(t) on the basis of the velocity $V_T$ and acceleration $\alpha T$ of the vehicle and the remainder distance $L_1$ to the target position.

The computer 16 starts the process periodically at a predetermined time of starting cycle, for example, every 100 ms. Initially, a hold time is set at a predetermined value, for example, 1.0 (sec), which corresponds to the time interval during which the output signal of the notch-change inhibit circuit 13 inhibits change of the notch. In the step 21, the hold time is decreased by the time of starting cycle and in the step 22, the decreased hold time is checked as to whether it is larger than zero or not. If the hold time is larger than zero, this cycle of the process ends. Thus, each cycle of the process starts at the starting cycle time of 100 ms after the start of the preceding cycle. When the hold time is decreased not larger than zero, the stop gap error $L_2$ is obtained on the basis of the equation (2) (step 23) and the time $\Delta t$ to braking control is obtained on the basis of the equation (3) (step 24). When the time $\Delta t$ becomes smaller than for example one second (step 25), the scalar values $L_Z$, $L_P$ and $L_N$ of stop gap accuracy are obtained on the basis of the equation (4) (step 26) and the membership functions $\mu_1(L_Z)$, $\mu_1(L_P)$, $\mu_1(L_N)$, and $\mu_2(L_Z)$, $\mu_2(L_P)$, and $\mu_2(L_N)$ are obtained on the basis of the equations (5) and (6) respectively (steps 27 and 28). Then checking is made as to which one is the maximum value $\mu_{max}$ among the values $\mu_1(L_Z)$, $\mu_2(L_P)$ and $\mu_2(L_N)$ (step 29) so as to select the control values $L_Z$, $L_P$ and $L_N$ which provide the maximum value $\mu_{max}$ (step 30), thereby correcting the current notch $N_t$ (step 31). If the notch $N_t$ is changed, the hold time is reset to the initial value of 1.0 (step 32).

Figure 8:
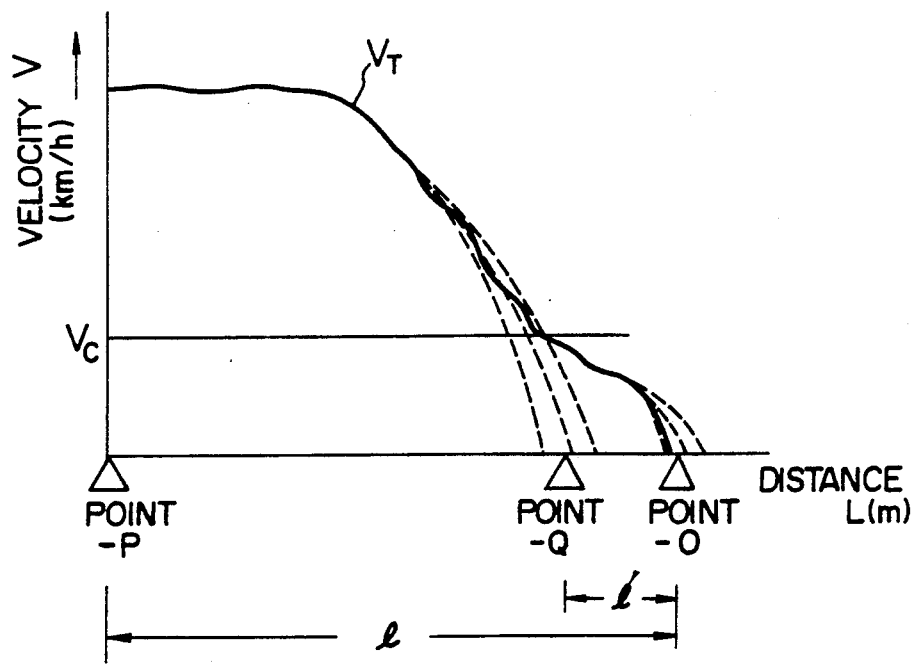
FIG. 8 is a graph illustrating a velocity pattern in a further embodiment of the present invention.

Although the membership functions of the support of fuzzy sets for defining the fuzzy value of stop gap accuracy are defined in accordance with the equations (5) and (6) in the above-mentioned embodiment, the invention is not limited to this definition. For example, as shown in FIG. 8, the target position may be changed step by step in such a manner that when the vehicle velocity is larger than a predetermined value $V_C$ (for example 10 Km/h), a point-Q which is placed by a distance $\lambda'$ (for example 2 m) on this side from the final target point-O is assumed to be a target and when the velocity becomes smaller than the above-mentioned value $V_C$, the point-O is made target.

Further, although the notch is changed to increase/decrease by one in the previous embodiment, it is needless to say that the notch may be changed by more than one notches.

As described above, according to the present invention, a method and a device for stopping a vehicle at a predetermined position in which the distance between actual and target positions of the vehicle and the velocity and acceleration of the vehicle are detected so as to perform brake control by selecting brake control notches on the basis of the detected values of the distance, the velocity and the acceleration to thereby stop the vehicle at the predetermined position, are featured in that the stop gap accuracy in the case where the notch presently on actuation is maintained as well as the stop gap accuracy are obtained as fuzzy values and compared with each other to thereby perform the notch selection, so that the vehicle may be safely stopped within the tolerance of the stop gap accuracy with less change of notching, resulting in a comfortable ride in the vehicle.

What we claim is:

1. A method for controlling a controllable subject to adapt the behavior of the subject to an optimum condition as to a predetermined control purpose, comprising:
 a first step of specifying a value of at least a first signal representing a current status of said subject;
 a second step of predicting, by using said specified value of said first signal, values of a parameter for evaluating a condition of said control purpose according to a predetermined formula, said values being those values which would be obtained, respectively, as a result of control operations under a plurality of different control instructions, if applied to said subject, respectively;
 a third step of converting each of said values of the parameter to at least one fuzzy value determined according to at least one of membership functions with respect to preselected performance indices relating to said control purpose, each of said membership functions defining a relationship between the fuzzy value and the value of the parameter; and fourth step of determining one control instruction to be applied to said subject among said different control instructions based on the fuzzy values of said parameter.

2. A method according to claim 1, wherein said different control instructions include at least a first instruction which is applied to said subject at present.

3. A method according to claim 2, wherein said determination of one control instruction is carried out by selecting one of predetermined rules, each of which comprises a first part designating one of said performance indices and a second part designating the control instruction to be selected, on the basis of the fuzzy values with respect to the performance indices defined in the first part of said respective rules, thereby selecting the control instruction defined in the selected rule.

4. A method for controlling a controllable subject to adapt the behavior of the subject to an optimum condition as to a predetermined control purpose, comprising:

a first step of specifying a value of least at first signal representing a current status of said subject;

a second step of predicting, by using said specified value of said first signal, values of a parameter for evaluating a condition of said control purpose according to a predetermined formula, said values being those values which would be obtained, respectively, as a result of control operations under a plurality of different control instructions, if applied to said subject, respectively;

a third step of converting each of said values of the parameter to at least one fuzzy value determined according to at least one of membership functions with respect to preselected performance indices relating to said control purpose, each of said membership functions defining relationship between the fuzzy value and the value of the parameter; and fourth step of determining whether a control instruction applied to said subject at present should be changed or not by evaluating the fuzzy values of said parameter.

5. A method for determining a control instruction for controlling a controllable subject in an optimum condition on the basis of a set of fuzzy reasoning control rules and membership functions, each of said control rules having a first part and a second part, said first part designating a relationship between a control instruction and at least one performance index relating to a predetermined control purpose of said controllable subject operated under said control instruction, said second part indicating a control instruction to be executed, each of said membership functions defining a relationship between a fuzzy value of one of said performance indices and a predicted value of a parameter for evaluating a condition of said control purpose, said method comprising:

a step of predicting, by using at least one value representing a current status of said controllable subject, values of said parameter obtained under a plurality of different control instructions;

a step of converting said predicted values of sad parameters to fuzzy values relating to at least one of said membership functions; and a step of determining one control instruction to be applied to said controllable subject among said different control instructions by evaluating said converted fuzzy values on the basis of said control rules.

6. A system for determining a control instruction to control a controllable subject in an optimum condition as to a predetermined control purpose, comprising:

means for storing a set of predetermined control rules, each of said control instructions comprising an if part and a then part, said if part designating an evaluation of at least one performance index relating to a control purpose of said controllable subject in combination with a control instruction which has an effect on a value of said performance index, said then part designating an execution of said control instruction;

means for predicting, by using at least one value representing a current status of said controllable subject, values of at least one parameter for evaluating a condition of said control purpose obtained under a plurality of different control instructions;

means for converting said predicted values of said parameters to fuzzy values relating to at least one of a plurality of membership functions, wherein each of said membership functions defines a relationship between a fuzzy value of one of said performance indices and a predicted value of said parameter for evaluating a condition of said control purpose; and means for evaluating said converted fuzzy values by using a set of said control rules stored in said storing means to determine a control instruction defined in said then part of a control rule which shows the best satisfaction as to said if part among the set of control rules, whereby said determined control instruction is applied to said controllable subject.

7. A system for determining a control instruction to be applied to a controllable subject by fuzzy reasoning, comprising:

means for storing a set of predetermined control rules, each of said control instructions comprising an if part and a then part, said if part including a statement for designating an evaluation of at least one performance index relating to a control purpose of said controllable subject in combination with a control instruction which has an effect on a value of said performance index, said then part including a statement for designating an execution of said control instruction defined in said if part;

means for predicting, by using at least one value representing a current status of said controllable subject and a plurality of different control instructions, values of at least one parameter for evaluating a condition of a control purpose of said controllable subject; and means for converting said predicted values of said parameters to fuzzy values relating to performance indices defined in said control rules by using at least one membership function which defines a relationship between a fuzzy value of one of said performance indices and a predicted value of said parameter for evaluating a condition of said control purpose; and means for determining a control instruction to be executed by evaluating said converted fuzzy values by fuzzy reasoning on the basis of said if part of said control rules stored in said storing means.

* * * * *